US012673576B2

(12) United States Patent
Decker

(10) Patent No.: US 12,673,576 B2
(45) Date of Patent: Jul. 7, 2026

(54) PREMISES ELECTRIC VEHICLE CHARGE DETECTION

(71) Applicant: Landis+Gyr Innovations, Inc., Alpharetta, GA (US)

(72) Inventor: David Decker, Atlanta, GA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 917 days.

(21) Appl. No.: 17/980,111

(22) Filed: Nov. 3, 2022

(65) Prior Publication Data

US 2024/0149736 A1    May 9, 2024

(51) Int. Cl.
B60L 53/65          (2019.01)
B60L 53/67          (2019.01)

(52) U.S. Cl.
CPC .............. B60L 53/65 (2019.02); B60L 53/67 (2019.02)

(58) Field of Classification Search
CPC ...................................................... B60L 53/65
USPC ........................................................ 320/109
See application file for complete search history.

(56) References Cited

U.S. PATENT DOCUMENTS

| | | |
|---|---|---|
| 11,381,081 B2 | 7/2022 | Hannon |
| 2016/0055419 A1 | 2/2016 | Fischer et al. |
| 2017/0148039 A1* | 5/2017 | Wilhelm ............... G06Q 50/06 |
| 2020/0122598 A1 | 4/2020 | Lu et al. |
| 2020/0380619 A1* | 12/2020 | Torpy ................... G06F 9/5077 |
| 2022/0129621 A1* | 4/2022 | Guda ...................... G06N 3/08 |
| 2022/0190641 A1* | 6/2022 | Decker ................ G01R 22/063 |
| 2022/0289064 A1* | 9/2022 | Lu ........................... H04W 4/44 |
| 2022/0294217 A1* | 9/2022 | Spalt ..................... G06Q 10/04 |

FOREIGN PATENT DOCUMENTS

| | | |
|---|---|---|
| WO | 2022170095 A1 | 8/2022 |
| WO | 2022193396 A1 | 9/2022 |

OTHER PUBLICATIONS

Gomez-Quiles, et al., "A Novel Ensemble Method for Electric Vehicle Power Consumption Forecasting: Application to the Spanish System", Institute of Electrical and Electronics Engineers Access, vol. 7, Aug. 20, 2019, pp. 120840-120856.
PCT Patent Application No. PCT/US2023/078511, International Search Report and Written Opinion, Mar. 21, 2024, 18 pages.

* cited by examiner

*Primary Examiner* — Jerry D Robbins
(74) *Attorney, Agent, or Firm* — Kilpatrick Townsend & Stockton LLP

(57)          ABSTRACT

A system includes a processor and a non-transitory, computer-readable memory that includes instructions executable by the processor for causing the processor to perform operations. The operations include accessing premises consumption data of a premises in a power distribution network. The premises consumption data includes an indication of premises resource consumption over a period of time. The operations also include applying a machine-learning model to the premises consumption data. The machine-learning model is trained to generate an output corresponding to an electric vehicle classification of the premises. Further, the operations include generating the electric vehicle classification of the premises using the output of the machine-learning model and controlling power generation of the power distribution network based on the electric vehicle classification of the premises.

20 Claims, 7 Drawing Sheets

PREMISES ELECTRIC VEHICLE CHARGE DETECTION

TECHNICAL FIELD

The present disclosure is generally related to consumption detection of a resource distribution system. More particularly, but not by way of limitation, the present disclosure is related to electric vehicle charge detection at premises of the resource distribution system.

BACKGROUND

In a resource distribution system, such as an electric grid that delivers electric power, premises may consume resources at varying rates over a period of time based on devices at the premises that consume the resources of the resource distribution system over the period of time. For example, the premises may consume a greater amount of electricity at various times throughout the day when an electric vehicle is charging at the premises. To ensure sufficient power generation to meet demand on the electric grid, it may be beneficial to accurately track premises that regularly charge electric vehicles.

Demands on a grid may change over time as additional electric vehicles require charging at various premises connected to the grid. For example, quantities of premises charging electric vehicles and various types of chargers used at the premises to charge the electric vehicles may change over time. Accurately tracking premises charging electric vehicles with minimal input from an occupant of the premises may be useful in driving the management of power generation in a resource distribution system.

SUMMARY

In one implementation, a system includes a processor and a non-transitory, computer-readable memory that includes instructions executable by the processor for causing the processor to perform operations. The operations include accessing premises consumption data of a premises in a power distribution network. The premises consumption data includes an indication of premises resource consumption over a period of time. The operations also include applying a machine-learning model to the premises consumption data. The machine-learning model is trained to generate an output corresponding to an electric vehicle classification of the premises. Further, the operations include generating the electric vehicle classification of the premises using the output of the machine-learning model and controlling power generation of the power distribution network based on the electric vehicle classification of the premises.

In another implementation, a non-transitory, computer-readable medium includes instructions that are executable by a processor for causing the processor to perform operations. The operations include accessing premises consumption data of a premises in a power distribution network. The premises consumption data includes an indication of premises resource consumption over a period of time. The operations also include applying a machine-learning model to the premises consumption data. The machine-learning model is trained to generate an output corresponding to an electric vehicle classification of the premises. Further, the operations include generating the electric vehicle classification of the premises using the output of the machine-learning model and controlling power generation of the power distribution network based on the electric vehicle classification of the premises.

In another implementation, a computer-implemented method includes accessing premises consumption data of a premises in a power distribution network. The premises consumption data includes an indication of premises resource consumption over a period of time. The method also includes applying a machine-learning model to the premises consumption data. The machine-learning model is trained to generate an output corresponding to an electric vehicle classification of the premises. Further, the method includes generating the electric vehicle classification of the premises using the output of the machine-learning model and controlling power generation of the power distribution network based on the electric vehicle classification of the premises.

BRIEF DESCRIPTION OF THE DRAWINGS

These and other features, aspects, and advantages of the present disclosure are better understood when the following Detailed Description is read with reference to the accompanying drawings.

DETAILED DESCRIPTION

Figure 1:
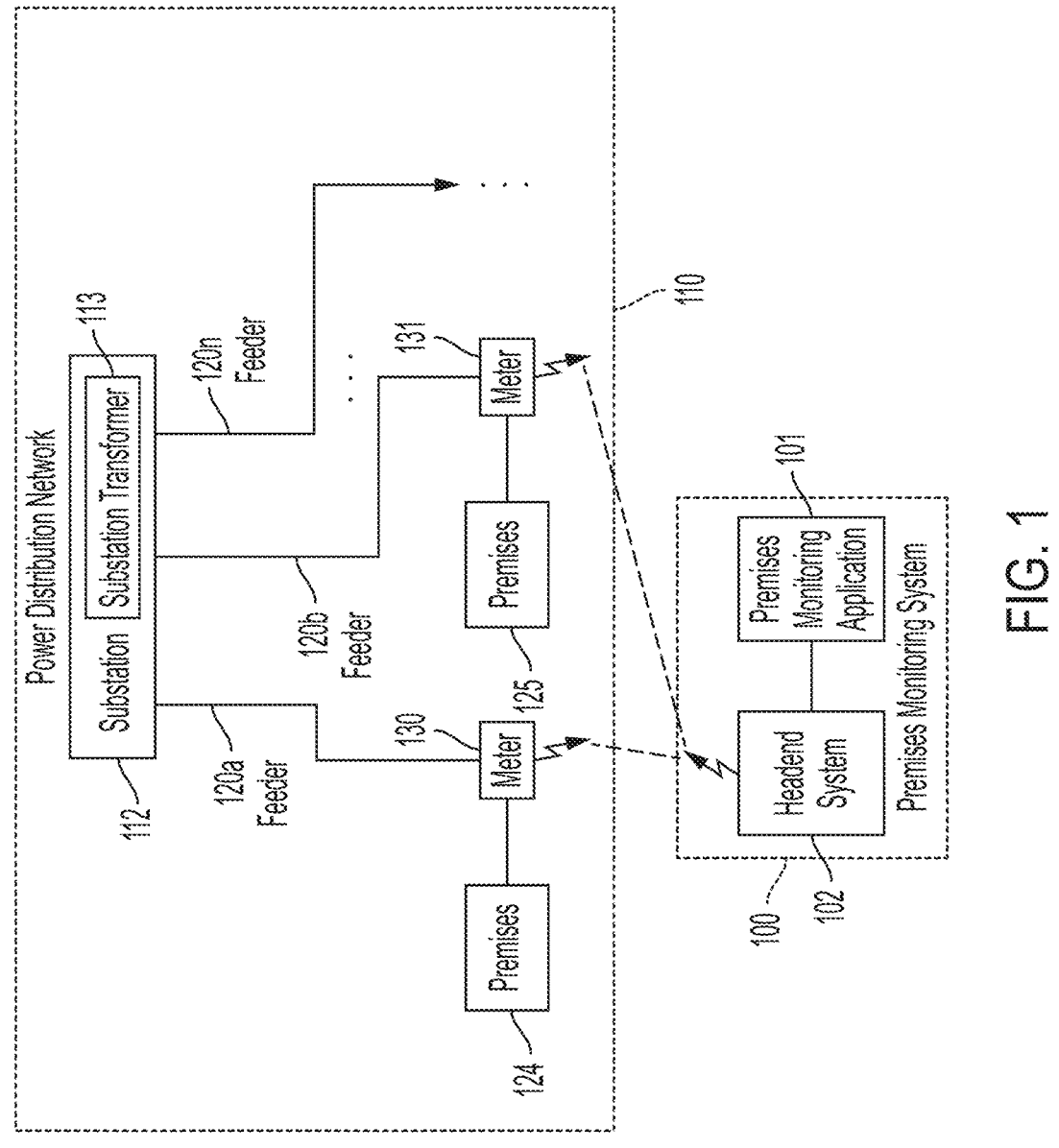
FIG. 1 illustrates an exemplary physical topology of a power distribution network showing devices at various points, or nodes, on the network, according to some implementations described herein.

The present disclosure describes techniques for providing electric vehicle charge detection at premises of the resource distribution system. In an example, resource distribution systems, such as an electric grid, may provide consumable resources to premises within the resource distribution systems. The premises may consume power, for example, at a different rate when electric vehicle charging occurs at the premises versus when no electric vehicle charging occurs at the premises. As more electric vehicles are charged by premises in the electric grid, a strain on the power generation capacity of the electric grid may be experienced. Further, because electric vehicles may charge during periods of time that are traditionally considered "low-demand" periods, such as overnight, the increase in charging during those low-demand periods may place unexpected strain on the grid when power generators are taken offline during the low-demand periods.

To maintain accurate information regarding a number of premises performing electric vehicle charging operations, time series of power consumption data may be obtained from the premises consuming power from the grid. The data may be processed by a trained machine-learning model to identify premises that are charging electric vehicles. For example, the trained machine-learning model may be applied to the data to distinguish electric vehicle charging operations from other types of charging operations at a premises. In some examples, the machine-learning model may also be trained to identify a type of charger (e.g., Level 1 or Level 2) performing the electric vehicle charging operations at the premises. Power generation of the grid and grid planning, generally, may be controlled based on the information identified by the machine-learning model. For example, as additional electric vehicles are detected charging at premises sharing a common transformer, the utility can proactively replace the common transformer to a higher capacity version of the transformer. Other components of the resource distribution network may also be replaced based on a likely shift from a typical demand at premises that are served by the other components as additional electric vehicles are charged at the premises served by the other components. In an additional example, as additional charging operations are detected at the premises, the power generated at times that the charging operations are most likely to occur may be increased. Similarly, identified peak-demand periods and low-demand periods may shift based on the additional electric vehicle charging operations, and operation of power generation equipment may be controlled in a manner that reflects the updated peak-demand periods and low-demand periods.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 illustrates an exemplary physical topology of a power distribution network showing devices at various points, or nodes, on the network. FIG. 1 depicts a premises monitoring system 100 and a power distribution network 110. In an example, the premises monitoring system 100 receives information from endpoint meters in the power distribution network 110 and determines premises on the power distribution network 110 that are performing electric vehicle charging operations. While the premises monitoring system 100 and the power distribution network 110 are described herein as a being part of a power distribution environment, other utility systems may incorporate similar premises monitoring systems 100. For example, the premises monitoring system 100 may be employed in a gas, water, or other utility distribution environment where it is desirable to monitor a particular resource consumption operation.

Figure 7:
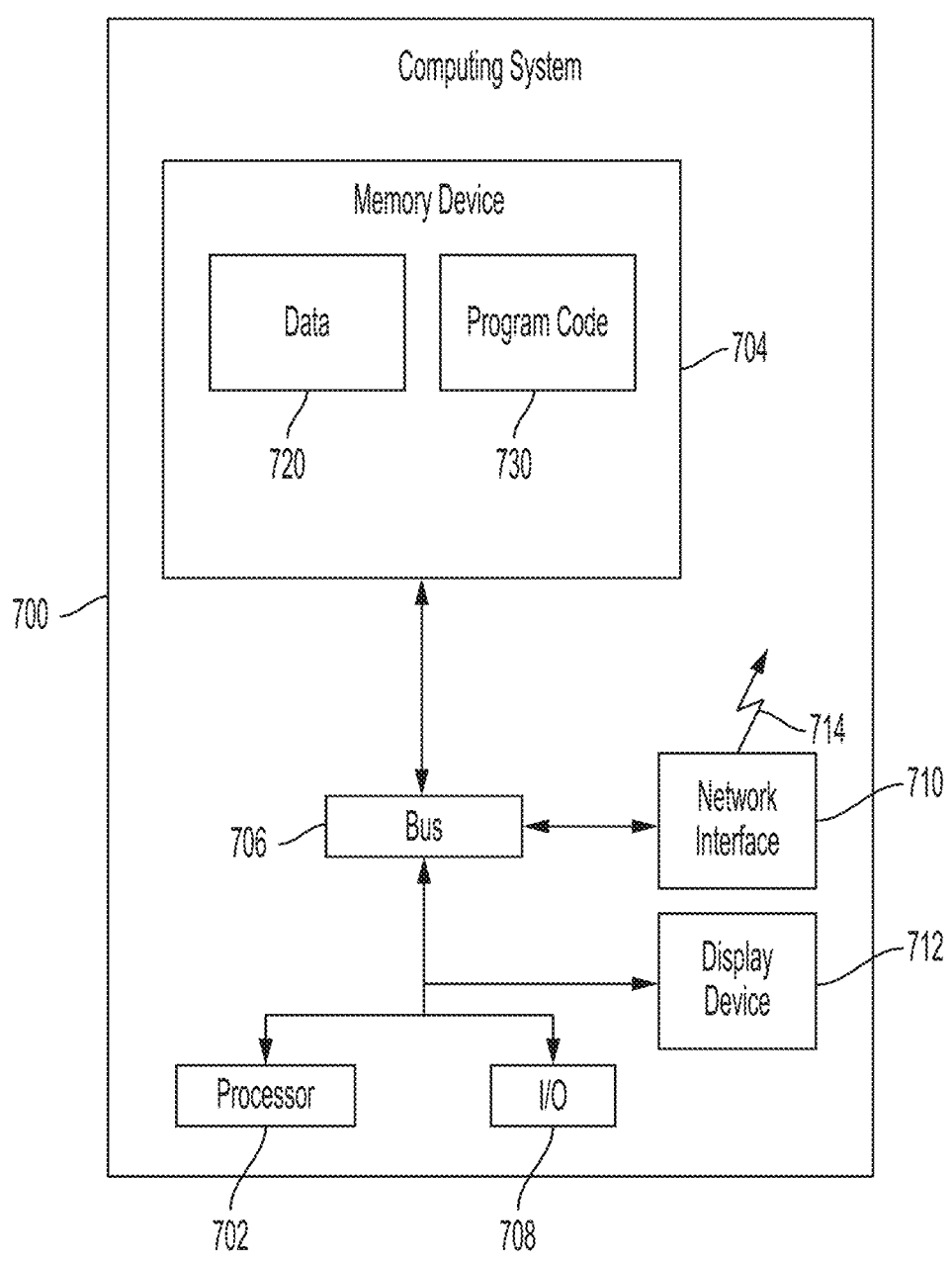
FIG. 7 is an exemplary computing device used for detecting electric vehicle charging operations, according to some implementations described herein.

The premises monitoring system 100 includes a premises monitoring application 101 and a headend system 102. The premises monitoring application 101 executes on a computing device as depicted in FIG. 7. The premises monitoring application 101 can receive metering data such as voltage, load, power consumption, etc., from meters that are installed at customers' premises. Other data from other data points may also be provided to the premises monitoring application 101. The premises monitoring application 101 receives metering data from the headend system 102 or through an intermediary that reads and aggregates the metering information. The meters may communicate metering information to the headend system via additional network devices and networks, which are not shown in the figures for simplicity. In some examples, the communications operations within the power distribution network 110 may be performed using radio frequency (RF) wireless communications, cellular communications, power-line communication (PLC) communications, or any other suitable communications technology. In some examples, the premises monitoring application 101 may be incorporated at the grid edge. In such an example, some decisions about the power distribution network 101 may be made in a decentralized manner (e.g., not through the headend system 102).

The power distribution network 110 can include a substation 112 and one or more feeders 120a-n. The substation 112 distributes power received from an electricity source to feeders 120a-n. Examples of electricity sources include coal plants, wind turbines, and solar panel installations. The substation 112 can include a substation transformer 113. The substation transformer 113 steps down a voltage provided to the substation 112 and outputs a lower voltage to the feeders 120a-120n. The substation 112 can distribute multiple phases (e.g., three phases) of power. While a single substation 112 is depicted in FIG. 1, the power distribution network 110 may include a plurality of similar substations.

Each feeder 120a-n may feed one or more premises, such as premises 124 or premises 125, through one or more meters, such as meters 130 and 131. The premises 124 or 125 may include houses, apartments, commercial buildings, or any other end users of the power provided by the power distribution network 110. In an example, the premises 124 and 125 are coupled to the meters 130 and 131. The meters 130 and 131 may meter power consumption by the premises 124 and 125, respectively, over time. While only the premises 124 and 125 are illustrated in the power distribution network 110, it may be appreciated that additional premises, such as an entire network of premises, may also be located in the power distribution network 110.

The premises monitoring application 101 may derive a set of details regarding the premises 124 and 125 based on power consumption data observed by the meters 130 and 131. For example, the meters 130 and 131 may transmit data relating to the power consumption at the premises 124 and 125 to the headend system 102. In an example, the premises monitoring application 101 may determine a condition (e.g., no electric vehicle charging, Level 1 electric vehicle charging, Level 2 electric vehicle charging, etc.) of a particular target premises. For example, the premises monitoring application 101 may leverage data obtained from the meters 130 and 131, and other data sources in the power distribution network 110, to predict the condition of premises in the power distribution network 110. In an example, the premises monitoring application 101 may apply one or more machine-learning models to the data obtained from the meters 130 and 131, the power distribution network 110, other relevant data sources, or a combination thereof to generate predicted indications of premises conditions. In some examples, new machine-learning models may be generated and trained for the purposes described herein. In other examples, data obtained from the meters 130 and 131, power distribution network 110, and other relevant data sources may have existing machine-learning models applied that are trained using data similar to the data collected by the meters 130 and 131. For example, a Supervised Regression Machine Learning model or Reinforcement Learning Model may be used for the purposes described herein.

Using predicted conditions of the premises, the premises monitoring application 101 may be used in power generation scheduling or other resource provision management operations for the power distribution network 110. For example, the predicted conditions of the premises may provide information that is used to predict power demand throughout the day. In such an example, premises with electric vehicle charging may consume more power overnight than premises without electric vehicle charging. By tracking the premises performing electric vehicle charging operations and the types of charging operations (e.g., Level 1 or Level 2), the power distribution network 110 may be able to control power generation to meet demands of electric vehicle charging operations on the power distribution network 110 at times that are typically considered non-peak periods. By controlling power generation based on the conditions of the premises, the power distribution network 110 may avoid strains on the network from excess consumption and avoid excess power generation from over-estimations of power consumption. In additional examples, the power distribution network 110 may intelligently schedule charging of detected electric vehicles using common grid components to ensure that the common grid components are not overloaded during charging operations.

As additional electric vehicles are detected charging at premises (or predicted for future charging operations at premises) sharing a common transformer, the utility can also proactively replace the common transformer to a higher capacity version of the transformer. Other components of the resource distribution network may also be replaced or otherwise updated based on a likely shift from a typical demand at premises that are served by the other components as additional electric vehicles are charged at the premises served by the other components.

In an example, the machine-learning models of the premises monitoring application 101 may be trained based on a historical corpus of data obtained from one or more power distribution networks. For example, training and validation data with a ground-truth state may be used to train the machine-learning models and to validate the accuracy of the trained machine-learning models. The machine-learning model may be trained in such a way that the historical data provided to the machine-learning model results in an output that matches the representation of the ground-truth state. After the initial training, and as the state of the power distribution network 110 evolves over time, the machine-learning models may be further adjusted with additional data points and additional ground-truth states obtained from the premises 125 and 125 of the power distribution network 110.

In some examples, the trained machine-learning model of the premises monitoring application 101 may be trained to forecast future conditions of the premises of the power distribution network 110. For example, the machine-learning model may utilize trends of the data provided by the conditions of the premises of the power distribution network 110 over time to predict electric vehicle charging operations at premises within the power distribution network 110 at future points in time. These forecasts may enable the utility to maintain plan for capacity changes within the power distribution network 110 over time.

In an example, an additional machine-learning model may be trained to generate the forecasts of electric vehicle charging operations within the power distribution network 110. In such an example, the outputs of the machine-learning model over time detecting the presence of the electric vehicle charging operations may be used as inputs to the additional machine-learning model. Thus, the additional machine-learning model may be trained to recognize trends that enable a prediction of future electric vehicle charging operations within the power distribution network 110.

Figure 2:
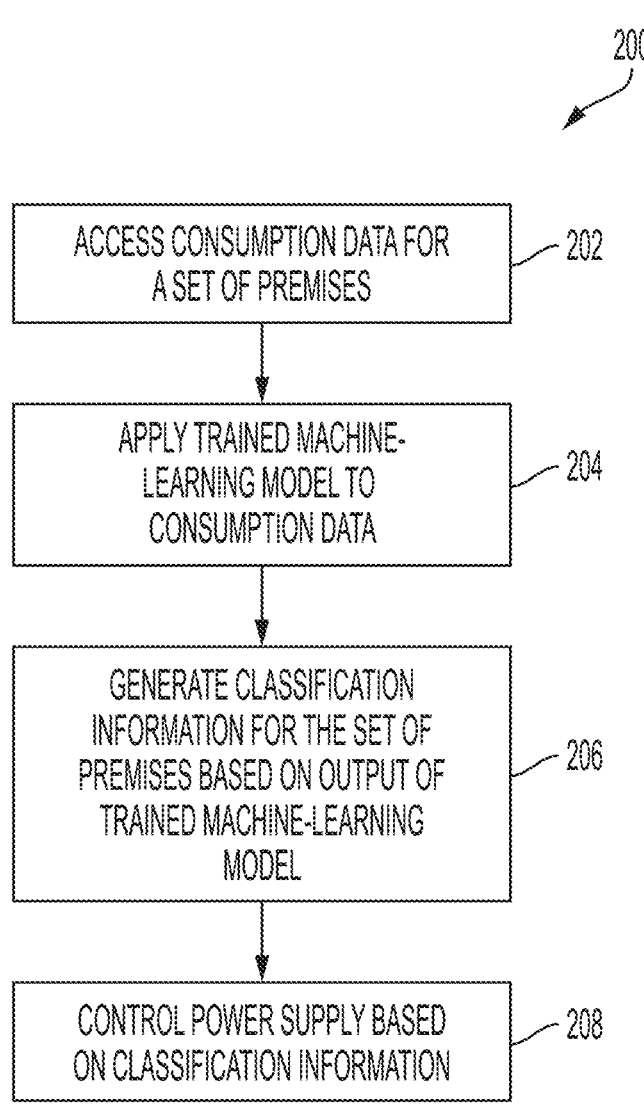
FIG. 2 is a flowchart of a process for controlling power supply of the power distribution network of FIG. 1 based on electric vehicle classifications of premises of the power distribution network, according to some implementations described herein.

FIG. 2 is a flowchart of a process 200 for implementing the premises monitoring application 101 to control power supplies of the power distribution network 110. At block 202, the process 200 involves accessing consumption data for a set of premises 124 and 125 within the power distribution network 110. The data may be received at the headend system 102 from metering devices 130 and 131 or from any other data collection points within the power distribution network 110. Some data may be automatically collected by the meters 130 and 131, and other data may be collected manually in response to maintenance operations. For example, maintenance operations such as installation of a distributed energy resources meter at a premises, installation of an electric vehicle charger at the premises, or other relevant maintenance operations may be manually collected and reported to the premises monitoring application 101.

At block 204, the process 200 involves applying a trained machine-learning model to the collected data. The trained machine-learning model may be trained to classify whether electric vehicle charging operations are occurring at the individual premises of the power distribution network 110. For example, the trained machine-learning model may be applied to the consumption data obtained at block 202, which may be a time series of power consumption at each premises. In some examples, the time series of power consumption may be an indication of an instantaneous consumption amount at an interval. For example, the instantaneous consumption amount may occur over a 7-day period at 10- or 15-minute intervals. The trained machine-learning model may be trained on similar data in the time domain to identify a set of premises performing electric vehicle charging operations.

At block 206, the process 200 involves generating classification information for the set of premises based on an output of the trained machine-learning model. In an example, the trained machine-learning model may be trained to output an indication of the premises performing electric vehicle charging operations or not performing electric vehicle charging operations. The electric vehicle classification of the premises may be a one-hot encoding of a SoftMax function of a set of possible electric vehicle classifications. In other words, the classification may be an indication of one class of a set of possible classifications for each premises. In some examples, the classification of the premises performing the electric vehicle charging operations may also involve identifying charger types performing the electric vehicle charging operations. For example, the classification of a premises may include an indication that a Level 1 electric vehicle charger or a Level 2 electric vehicle charger is operating at the premises. In an example, a Level 1 charger may deliver around 1.2 kW and is operated directly from a standard 120 VAC outlet. A Level 2 charger may be a charger that ranges from 6.2 to 19.2 kW and may rely on a 208-240 V, 12-80 Amp circuit. In some examples, each of the premises within the power distribution network 110 may be classified based on whether electric vehicle charging operations occur at the premises.

At block 208, the process 200 involves controlling a power supply of the power distribution network 110 based on the classifications of the premises generated by the machine-learning model. In an example, the classifications generated by the machine-learning model identify a number of premises performing electric vehicle charging operations within the power distribution network 110 and, in some examples, identify types of chargers performing the electric vehicle charging operations. The power generators that provide power to the power distribution network 110 may be controlled to meet an expected demand of the power distribution network 110 using information associated with an amount of the premises that perform electric vehicle charging operations. For example, as the number of premises performing the charging operations grows, the power generators may increase power supply provided to the power distribution network 110 during time periods where charging operations are likely to occur.

In an example, the power supply of the power distribution network 110 may be adjusted contemporaneously with detecting a new premises performing electric vehicle charging operations. In some examples, the power supply of the power distribution network 110 may only be adjusted when a threshold number of new premises performing the electric vehicle charging operations is detected. For example, control of the power supply may occur when an aggregate number of new premises performing electric vehicle charging operations—since a previous adjustment to the power supply—is expected to have an impact on the ability of the power distribution network 110 to meet demand at the premises. In such an example, if the aggregate number of new premises performing electric vehicle charging operations is expected to result in the power distribution network 110 consuming a threshold percentage more power (e.g., 1% more, 5% more, etc.) than after the previous adjustment, then the power supply may be adjusted. Other threshold percentages may also be used, and other triggering events associated with the addition of premises performing electric vehicle charging operations may also trigger adjustment of the power supply at block 208. In some examples, the classification information may also be used by the power distribution network 110 to determine whether components of the power distribution network 110 should be updated for higher capacity. For example, a transformer operating with several premises that are classified as performing electric vehicle charging operations may be updated to a higher capacity model than a typical standard capacity transformer. Other types of components of the power distribution network 110 may also be updated.

In some examples, the process 200 may be implemented at any utility with a sensor network that provides sensed data. The sensed data from the sensor network may be leveraged by the machine-learning models to forecast power consumption demands for the utility.

Figure 3:
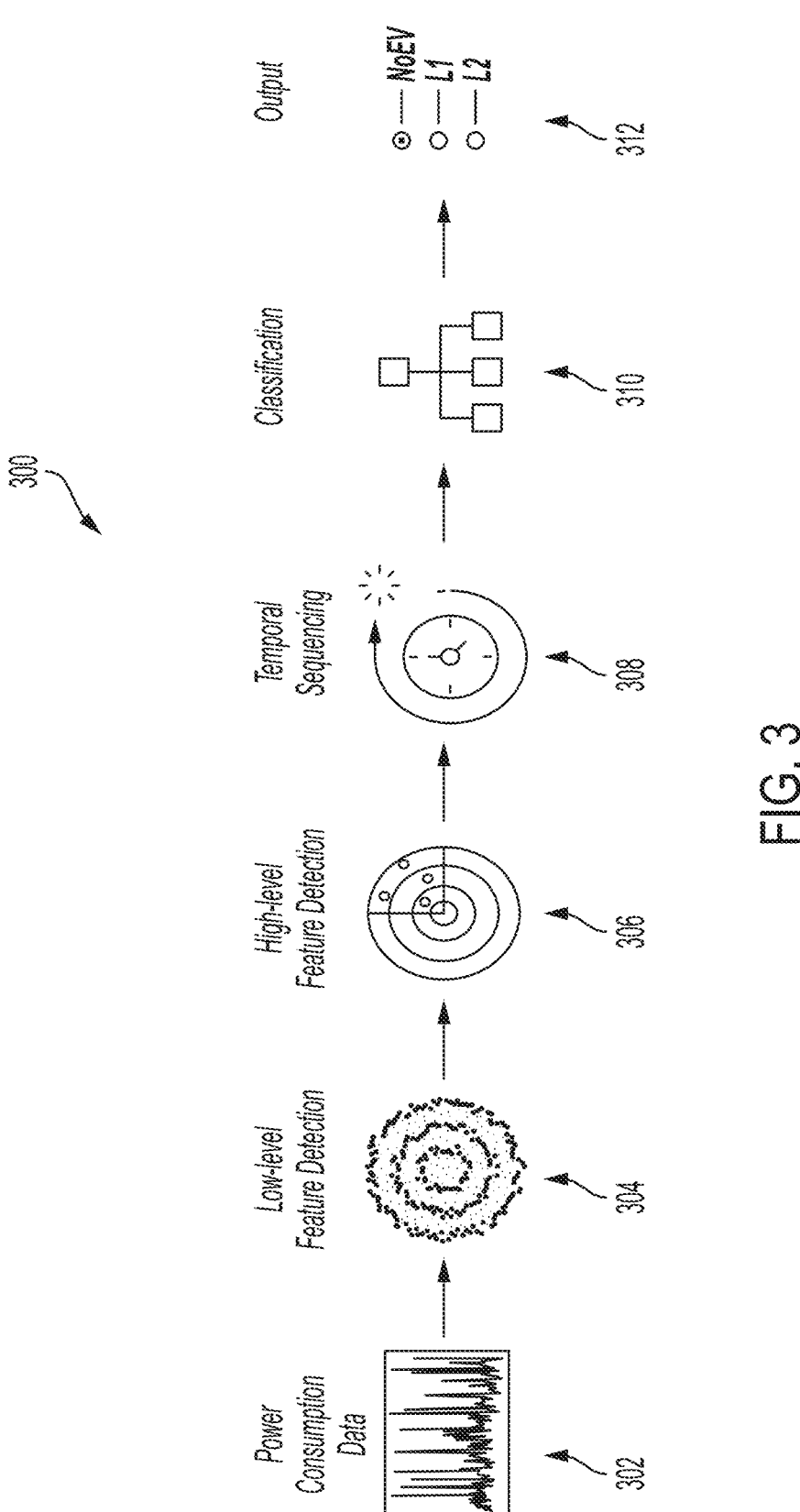
FIG. 3 is an example of a diagrammatical representation of a data flow for identifying premises performing electric vehicle charging operations, according to some implementations described herein.

FIG. 3 is an example of a diagrammatical representation of a data flow 300 for identifying the premises performing electric vehicle charging operations, according to some implementations described herein. Power consumption data 302 may be received at the premises monitoring system 100. In an example, the power consumption data 302 is a set of consumption data in the time domain of the premises within the power distribution network 110. The power consumption data 302 may be taken over a period of 7 days at 10- or 15-minute intervals for each premises within the power distribution network 110 where a determination is desired regarding whether a premises is performing an electric vehicle charging operations. Other periods of time and interval length may also be used.

A trained machine-learning model, such as a convolutional neural network, may be applied to the power consumption data 302 to detect low-level features 304 of the power consumption data 302. The low-level features 304 may include relatively coarse features represented by the power consumption data 302. For example, the low-level features 304 may include consumption peaks for the premises over time, consumption floors for the premises over time, or any other data anomalies associated with the power consumption data 302.

Upon detecting the low-level features 304, the machine-learning model may detect high-level features 306 of the power consumption data 302. For example, the machine-learning model may be used to interpret or otherwise classify the low-level features 304 of the power consumption data 302. In some examples, the high-level features 306 may be identified by layers of the machine-learning model that are closer to an output layer than the layers used to generate the low-level features 304.

Temporal sequencing 308 of the power consumption data 302 may also be used by the machine-learning model. As the power consumption data 302 is provided in the time domain, various features of the power consumption data 302 may be relevant to the temporal sequence of the power consumption data 302. For example, the machine-learning model may use the temporal sequencing 308 to identify features of the power consumption data 302 that are likely to occur in series with particular events or at certain times during a particular day. Electric vehicle charging occurring at particular times (e.g., overnight) may be a significant indicator used by the machine-learning model to identify electric vehicle charging operations at a premises. Additionally, a length of time of heightened power consumption identified by the power consumption data 302 may also be an indicator used by the machine-learning model to identify a type of charger used at the premises for the electric vehicle charging operations. For example, a charging operation performed by a Level 1 charger may have heightened power consumption over a longer amount of time than a charging operation performed by a Level 2 charger.

Classifications 310 may be generated for each of the premises represented in the power consumption data 302 based on the low-level feature detection 304, the high-level feature detection 306, and the temporal sequencing 308. In an example, the classifications can include an indication that the premises does not perform electric vehicle charging operations, an indication that the premises performs Level 1 electric vehicle charging operations, or an indication that the premises performs Level 2 electric vehicle charging operations. Other classifications 310 may also be possible, such as identifying other types of chargers, identifying charge capacities of electric vehicles being charged, detecting other types of charging operations (e.g., stationary batteries at the premises), etc. Once the classifications 310 are determined by the machine-learning model, an output 312 may be generated for use in controlling power generation operations to meet demand needs of the premises within the power distribution network 110.

Figure 4:
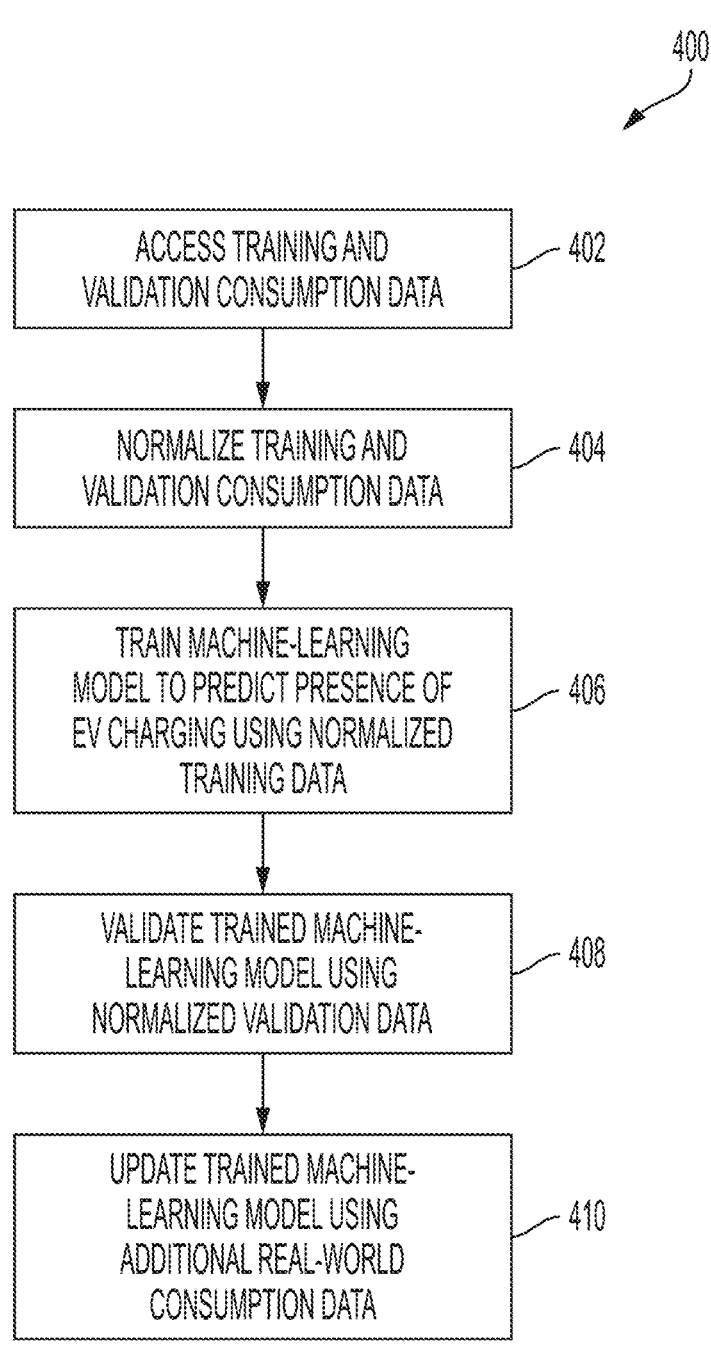
FIG. 4 is a flowchart of a process for training a machine-learning model to identify premises performing electric vehicle charging operations, according to some implementations described herein.

FIG. 4 is a flowchart of a process 400 for training a machine-learning model to identify premises performing electric vehicle charging operations, according to some implementations described herein. At block 402, the process 400 involves accessing a corpus of training and validation power consumption data. In an example, a corpus of data may be divided into a set of training data and a set of validation data that is used to validate the machine-learning model that is trained using the set of training data. The corpus of training data may be a National Renewable Energy Laboratory (NREL) dataset labeled with electric vehicle charging operation information for 600 premises taken over 52 weeks with readings taken at 10-minute intervals. In some examples, the NREL dataset may be further broken up into subsets of data with 7 days of consumption measured at 10-minute intervals, and machine-learning models may be trained at block 406, below, using these subsets of the NREL dataset. Training labels may be one-hot training labels identifying each individual set of data as not performing electric vehicle charging operations, as performing Level 1 charging operations, or as performing Level 2 charging operations. Other datasets may also be used as training and validation data.

At block 404, the process 400 involves normalizing the training and validation consumption data. In an example, the normalization may involve assigning values between 0 and 1 that correspond to kW values in the consumption data. For example, 0 may represent 0 kW, 1 may represent 35 kW, and all values between 0 kW and 35 kW may be assigned corresponding values between 0 and 1. Normalization of the training and validation data may be performed using min-max scaling. In an example, the premises consumption data to which the trained machine-learning model is applied may also be normalized using a min-max scaling operation. Other normalization scaling operations may also be used.

At block 406, the process 400 involves training a machine-learning model to classify a presence of electric vehicle charging operations using the normalized training data. Using the labeled and normalized training data, the machine-learning model may be trained to recognize premises that are performing electric vehicle charging operations. In an example, the training data is provided to the machine-learning model in the time domain. Accordingly, the trained machine-learning model may be applied to consumption data, also in the time domain, to classify whether electric vehicle charging operations occur at a premises and, if so, to classify a type of charging operation.

At block 408, the process 400 involves validating the trained machine-learning model using the normalized validation data. The normalized validation data may be a subset of a corpus of the NREL dataset that was not used to train the machine-learning model. By validating the trained machine-learning model, the accuracy of the machine-learning model may be assessed. In some examples, the validation process may involve determining that the classification accuracy for the validation data exceeds an accuracy threshold. For example, the trained machine-learning model may be implemented when the validation accuracy is greater than 95%. Other threshold accuracy percentages may also be used.

At block 410, the process 400 involves updating the trained machine-learning model using additional real-world consumption data. In some examples, the trained machine-learning model may continually learn based on additional data received by the machine-learning model. In such an example, the machine-learning model may be updated based on additional real-world consumption data that is supplied to the machine-learning model for further updates. Such continual learning may be advantageous as electric vehicles and electric vehicle charging operations evolve over time.

Exemplary Machine-Learning Environments

Figure 5:
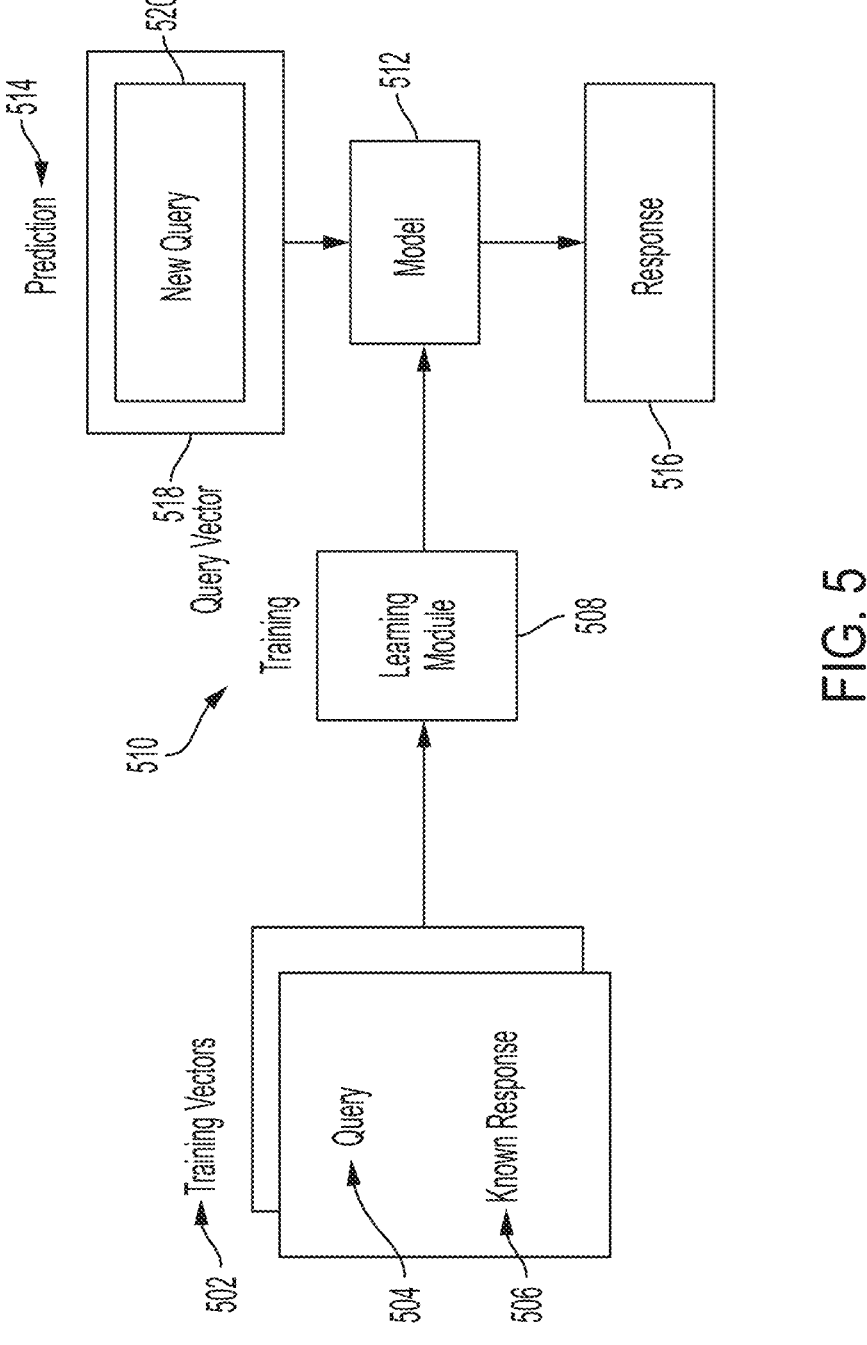
FIG. 5 is an example of a machine learning model environment used to identify premises performing electric vehicle charging operations, according to some implementations described herein.

FIG. 5 is an example of a machine learning environment used to identify premises performing electric vehicle charging operations, according to some implementations described herein. Training vectors 502 are shown with query 504 and a known response 506. As examples, a query could be a request for classifying an electric vehicle charging status of a premises of the power distribution network 110. For example, the query 504 may be a classification problem, such as an indication of whether a premises is performing a charging operation and, if so, a type of charging operation performed by the premises. For ease of illustration, only two training vectors 502 are shown, but the number of training vectors may be much larger, e.g., 10, 50, 100, 1,000, 10,000, 100,000, or more.

The training vectors 502 can be used by a learning module 508 to perform training 510 of a model 512. The learning module 508 can optimize parameters of the model 512, such as a machine-learning model, such that a quality metric (e.g., an accuracy of the model 512) is achieved with one or more specified criteria. The accuracy may be measured by comparing the known responses 506 to predicted outputs of the model 512. Parameters of the model 512 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measurement of accuracy for the current state of the model 512. The gradient can be used in conjunction with a learning step (e.g., a measure of how much the parameters of the model 512 should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 514 can provide a predicted response 516 for a query vector 518 based on a new query 520. The new query 520 can be of a similar type as the query 504 of the training vectors 502. If new query records are of a different type, a transformation can be performed on the data to obtain data in a similar format as the format of the training vectors 502. A predicted response 516 may correspond to the question encoded in the query vector 518. In some examples, the predicted response 516 may be an indication of whether a premises 124 of the power distribution network 110 performs electric vehicle charging operations. In an additional example, the predicted response 516 may also indicate a type of charging operation performed at the premises (e.g., Level 1 or Level 2 electric vehicle charging). The model 512 may also be trained to generate other predictions relevant to identification of electric vehicle charging on the power distribution network 110.

The model 512 may include machine-learning models such as deep-learning models, neural networks (e.g., deep-learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 6:
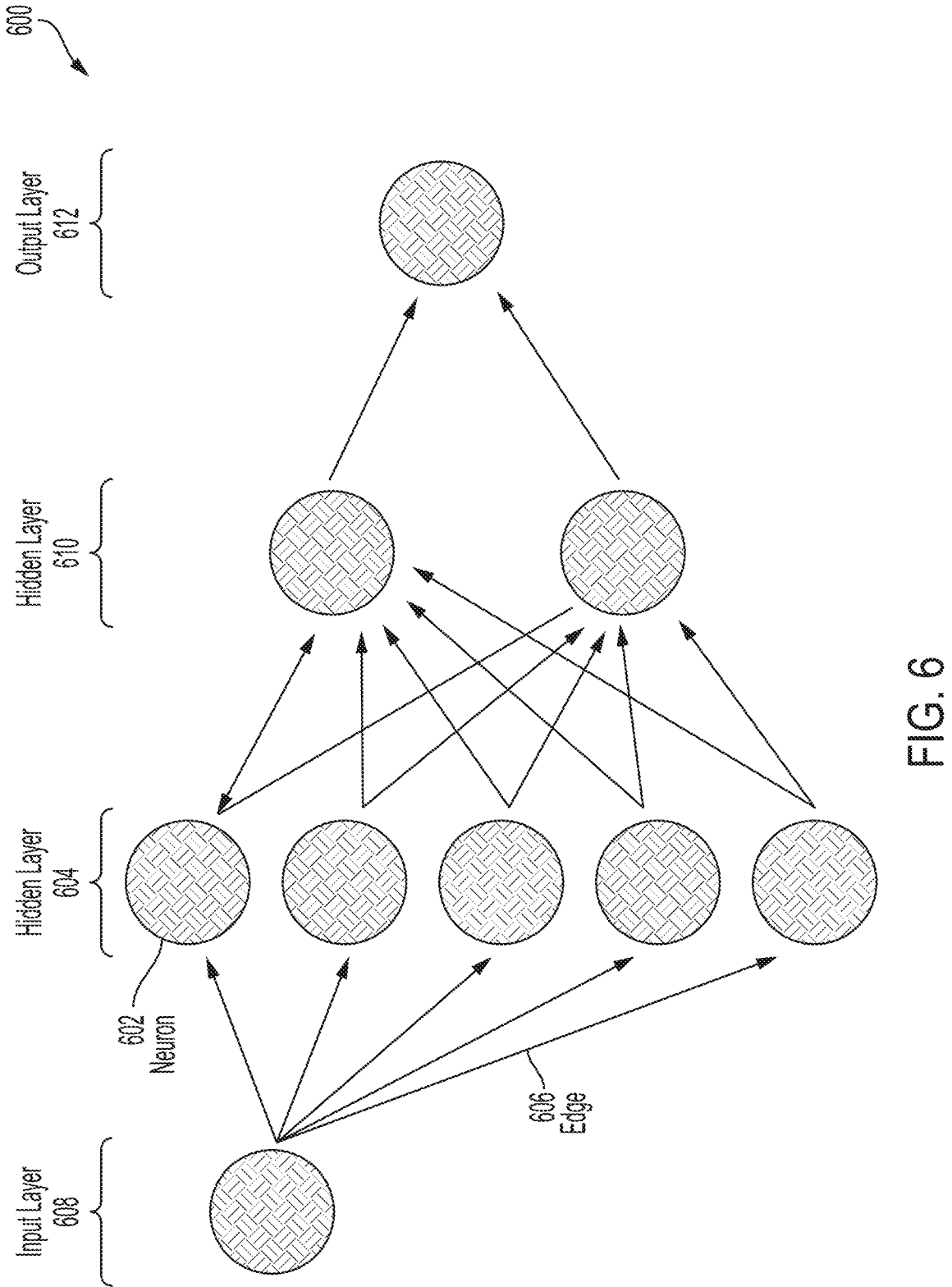
FIG. 6 is an example machine learning model of an artificial neural network, according to some implementations described herein.

FIG. 6 is an example machine-learning model of an artificial neural network 600, according to some implementations described herein. As an example, the model 512 can be the artificial neural network 600 that includes a number of neurons 602 (e.g., adaptive basis functions) organized in layers. The layers may include an input layer 608, a first hidden layer 604, a second hidden layer 610, and an output layer 612. Other layer arrangements are also contemplated. For example, the artificial neural network 600 may have more or fewer hidden layers than the two depicted in FIG. 6. The neurons 602, or nodes, can be connected by edges 606. The training of the artificial neural network 600 can iteratively search for the best configuration of the parameters of the neural network for feature recognition, classification, and/or prediction performance. Various numbers of layers and nodes may be used. A person of ordinary skill in the art can easily recognize variations in a neural network design and design of other machine learning models.

Exemplary Computing Devices Used for Premises Monitoring

FIG. 7 illustrates an exemplary computing device used for detecting electric vehicle charging operations, according to some implementations described herein. Any suitable computing system may be used for performing the operations described herein. The depicted example of a computing device 700 includes a processor 702 communicatively coupled to one or more memory devices 704. The processor 702 executes computer-executable program code 730 stored in a memory device 704, accesses data 720 stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices or cores, including a single processing device. The functionality of the computing device may be implemented in hardware, software, firmware, or a combination thereof.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 700 may also include a number of external or internal devices, such as input or output devices. For example, the computing device 700 is shown with one or more input/output ("I/O") interfaces 708. An I/O interface 708 can receive input from input devices or provide output to output devices. One or more busses 706 are also included in the computing device 700. The bus 706 communicatively couples one or more components of a respective one of the computing device 700.

The computing device 700 executes program code 730 that configures the processor 702 to perform one or more of the operations described herein. For example, the program code 730 causes the processor to perform the operations described in FIGS. 1-6.

The computing device 700 also includes a network interface device 710. The network interface device 710 includes any device or group of devices suitable for establishing a wired or wireless data connection to one or more data networks. The network interface device 710 may be a wireless device and have an antenna 714. The computing device 700 can communicate with one or more other computing devices implementing the computing device or other functionality via a data network using the network interface device 710.

The computing device 700 can also include a display device 712. Display device 712 can be a LCD, LED, touchscreen, or other device operable to display information about the computing device 700. For example, information could include an operational status of the computing device, network status, etc.

While the present subject matter is described in detail with respect to specific aspects thereof, it will be appreciated that those skilled, upon attaining an understand of the foregoing and the following, may readily produce alternations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:
a processor; and
a non-transitory, computer-readable memory that includes instructions executable by the processor for causing the processor to perform operations comprising:
accessing premises consumption data of a premises in a power distribution network, wherein the premises consumption data comprises an indication of premises resource consumption over a period of time;
applying a machine-learning model to the premises consumption data, wherein the machine-learning model is trained to generate an output corresponding to an electric vehicle charger classification of the premises;
generating the electric vehicle charger classification of the premises using the output of the machine-learning model; and
controlling power generation of the power distribution network based on the electric vehicle charger classification of the premises.

2. The system of claim 1, wherein the operations further comprise:
training the machine-learning model to generate the output corresponding to the electric vehicle charger classification of the premises using training vectors of ground-truth data of a plurality of premises of an additional power distribution network.

3. The system of claim 2, wherein the operations further comprise:
updating the machine-learning model using additional consumption data from a plurality of premises of the power distribution network.

4. The system of claim 1, wherein the electric vehicle charger classification of the premises comprises an indication that the premises does not charge an electric vehicle, an indication that the premises charges the electric vehicle using a first type of electric vehicle charger, or an indication that the premises charges the electric vehicle using a second type of electric vehicle charger.

5. The system of claim 1, wherein the electric vehicle charger classification of the premises comprises a one-hot encoding of a SoftMax function of a set of possible electric vehicle charger classifications.

6. The system of claim 1, wherein the indication of premises resource consumption over the period of time comprises a time series of power consumption by the premises over a plurality of days at regular time intervals.

7. The system of claim 1, wherein the operations further comprise:

normalizing the premises consumption data using min-max scaling also used to normalize training consumption data used to train the machine-learning model.

8. The system of claim 1, wherein the premises consumption data comprises time-domain data.

9. A non-transitory, computer-readable medium comprising instructions that are executable by a processor for causing the processor to perform operations comprising:

accessing premises consumption data of a premises in a power distribution network, wherein the premises consumption data comprises an indication of premises resource consumption over a period of time;

applying a machine-learning model to the premises consumption data, wherein the machine-learning model is trained to generate an output corresponding to an electric vehicle charger classification of the premises;

generating the electric vehicle charger classification of the premises using the output of the machine-learning model; and controlling power generation of the power distribution network based on the electric vehicle charger classification of the premises.

10. The non-transitory, computer-readable medium of claim 9, wherein the operations further comprise:

training the machine-learning model to generate the output corresponding to the electric vehicle charger classification of the premises using training vectors of ground-truth data of a plurality of premises of an additional power distribution network.

11. The non-transitory, computer-readable medium of claim 10, wherein the operations further comprise:

updating the machine-learning model using additional consumption data from a plurality of premises of the power distribution network.

12. The non-transitory, computer-readable medium of claim 9, wherein the electric vehicle charger classification of the premises comprises an indication that the premises does not charge an electric vehicle, an indication that the premises charges the electric vehicle using a level 1 electric vehicle charger, or an indication that the premises charges the electric vehicle using a level 2 electric vehicle charger.

13. The non-transitory, computer-readable medium of claim 9, wherein the electric vehicle charger classification of the premises comprises a one-hot encoding of a SoftMax function of a set of possible electric vehicle charger classifications.

14. The non-transitory, computer-readable medium of claim 9, wherein the operations further include:

applying an additional machine-learning model to the electric vehicle charger classification of the premises; and generating a forecast of future electric vehicle charging operations using an output of the additional machine-learning model.

15. A computer-implemented method comprising:

accessing premises consumption data of a premises in a power distribution network, wherein the premises consumption data comprises an indication of premises resource consumption over a period of time;

applying a machine-learning model to the premises consumption data, wherein the machine-learning model is trained to generate an output corresponding to an electric vehicle charger classification of the premises;

generating the electric vehicle charger classification of the premises using the output of the machine-learning model; and controlling power generation of the power distribution network based on the electric vehicle charger classification of the premises.

16. The computer-implemented method of claim 15, further comprising:

applying an additional machine-learning model to the electric vehicle charger classification of the premises and a plurality of additional electric vehicle charger classifications of additional premises in the power distribution network; and generating a forecast of future electric vehicle charging operations in the power distribution network using an output of the additional machine-learning model.

17. The computer-implemented method of claim 15, wherein the electric vehicle charger classification of the premises comprises an indication that the premises does not charge an electric vehicle, an indication that the premises charges the electric vehicle using a level 1 electric vehicle charger, or an indication that the premises charges the electric vehicle using a level 2 electric vehicle charger.

18. The computer-implemented method of claim 15, wherein the electric vehicle charger classification of the premises comprises a one-hot encoding of a SoftMax function of a set of possible electric vehicle charger classifications.

19. The computer-implemented method of claim 15, wherein the indication of premises resource consumption over the period of time comprises a time series of power consumption by the premises over a plurality of days at regular time intervals.

20. The computer-implemented method of claim 15, wherein the premises consumption data comprises time-domain data.

* * * * *